(12) United States Patent
Cook et al.

(10) Patent No.: US 7,694,476 B2
(45) Date of Patent: Apr. 13, 2010

(54) SYSTEMS AND METHODS FOR IN-LINE BASE PLATE TERMINATION IN MONOPOLE STRUCTURES

(75) Inventors: Bradley J. Cook, Boulder, CO (US); Dan J. Welch, Boulder, CO (US)

(73) Assignee: Structural Components LLC, Boulder, CO (US)

( * ) Notice: Subject to any disclaimer, the term of this patent is extended or adjusted under 35 U.S.C. 154(b) by 0 days.

(21) Appl. No.: 12/040,799

(22) Filed: Feb. 29, 2008

(65) Prior Publication Data

US 2009/0217618 A1    Sep. 3, 2009

(51) Int. Cl.
  E02D 27/32    (2006.01)
  E04C 3/00     (2006.01)
  B65D 19/00    (2006.01)
  F16B 5/00     (2006.01)

(52) U.S. Cl. .................. 52/296; 52/848; 248/346.01; 403/335

(58) Field of Classification Search .......... 52/170, 52/169.13, 296, 834, 843, 40, 848, 480, 506.05, 52/509; 248/511, 519, 523, 529, 539, 346.01, 248/346.03, 346.3, 346, 678; 285/412, 416; 403/183, 335, 336, 337
See application file for complete search history.

(56) References Cited

U.S. PATENT DOCUMENTS

| | | | | |
|---|---|---|---|---|
| 2,181,196 A | * | 11/1939 | Miller | ......................... 285/416 |
| 3,345,096 A | * | 10/1967 | Tetsuya | ....................... 403/245 |
| 3,410,995 A | * | 11/1968 | Gray | ............................... 52/28 |
| 3,571,991 A | * | 3/1971  | Doocy et al. | ..................... 52/40 |
| 3,837,752 A | * | 9/1974  | Shewchuck | ..................... 403/2 |
| 3,861,098 A |   | 1/1975  | Schaub | |
| 3,977,531 A | * | 8/1976  | Brewer | ......................... 212/300 |
| 4,048,776 A |   | 9/1977  | Sato | |
| 4,053,082 A |   | 10/1977 | Ullman | |
| 4,079,559 A |   | 3/1978  | Tenbrummeler | |
| 4,228,627 A | * | 10/1980 | O'Neil | ......................... 52/295 |

(Continued)

FOREIGN PATENT DOCUMENTS

JP      2002227188      8/2002

OTHER PUBLICATIONS

International Search Report and Written Opinion for PCT/US2009/035098, mailed Apr. 27, 2009.

*Primary Examiner*—Robert J Canfield
*Assistant Examiner*—Babajide Demuren
(74) *Attorney, Agent, or Firm*—Faegre & Benson, LLP

(57) ABSTRACT

An apparatus for inline base termination of a monopole structure includes an upper base plate configured to be joined to a bottom end of a monopole, a lower base plate including a plurality of bolt holes, and a plurality of web plates connecting the upper and lower base plates, such that a virtual projection of the monopole through the lower base plate intersects the plurality of bolt holes. Another inline base termination apparatus includes a hollow monopole with outer shell, a base plate having a plurality of bolt holes formed therein in a circular pattern and evenly circumferentially spaced, and a plurality of web plates, each of which has a longitudinal slot configured to receive the monopole and is joined to the base plate between two adjacent bolt holes, such that a virtual projection of the hollow monopole through the base plate intersects the plurality of bolt holes.

14 Claims, 13 Drawing Sheets

U.S. PATENT DOCUMENTS

| | | |
|---|---|---|
| 4,269,010 A | 5/1981 | Glass |
| 4,295,308 A * | 10/1981 | Korfanta .................. 52/296 |
| D273,712 S | 5/1984 | Ahlqvist |
| 4,649,675 A | 3/1987 | Moldovan et al. |
| 4,674,907 A | 6/1987 | Shewchuk |
| 5,054,135 A | 10/1991 | Dallaire et al. |
| 5,333,436 A * | 8/1994 | Noble ........................ 52/849 |
| 5,568,909 A | 10/1996 | Timko |
| 5,687,537 A * | 11/1997 | Noble ........................ 52/849 |
| 5,771,093 A | 6/1998 | Tinti et al. |
| 5,819,487 A | 10/1998 | Bull et al. |
| 6,453,636 B1 * | 9/2002 | Ritz ............................ 52/835 |
| 6,467,811 B2 * | 10/2002 | Mitchell ..................... 285/15 |
| 6,820,389 B1 * | 11/2004 | Macchietto .................. 52/835 |
| 6,857,808 B1 * | 2/2005 | Sugimoto et al. ............. 403/41 |
| 6,873,303 B2 | 3/2005 | Creighton et al. |
| 6,901,717 B2 | 6/2005 | Brunozzi et al. |
| 6,910,666 B2 | 6/2005 | Burr |
| 7,098,864 B2 | 8/2006 | Ryan |
| 2002/0056250 A1 | 5/2002 | Cash |
| 2004/0031902 A1 | 2/2004 | Davis, Jr. |
| 2004/0194402 A1 * | 10/2004 | Payne ........................ 52/170 |
| 2004/0211148 A1 * | 10/2004 | Foust et al. ................ 52/720.1 |
| 2005/0056741 A1 | 3/2005 | Higgs et al. |
| 2005/0183364 A1 * | 8/2005 | Cash .......................... 52/296 |
| 2005/0225087 A1 * | 10/2005 | McMahon et al. ........... 285/412 |
| 2006/0232490 A1 | 10/2006 | Bisiules et al. |

\* cited by examiner

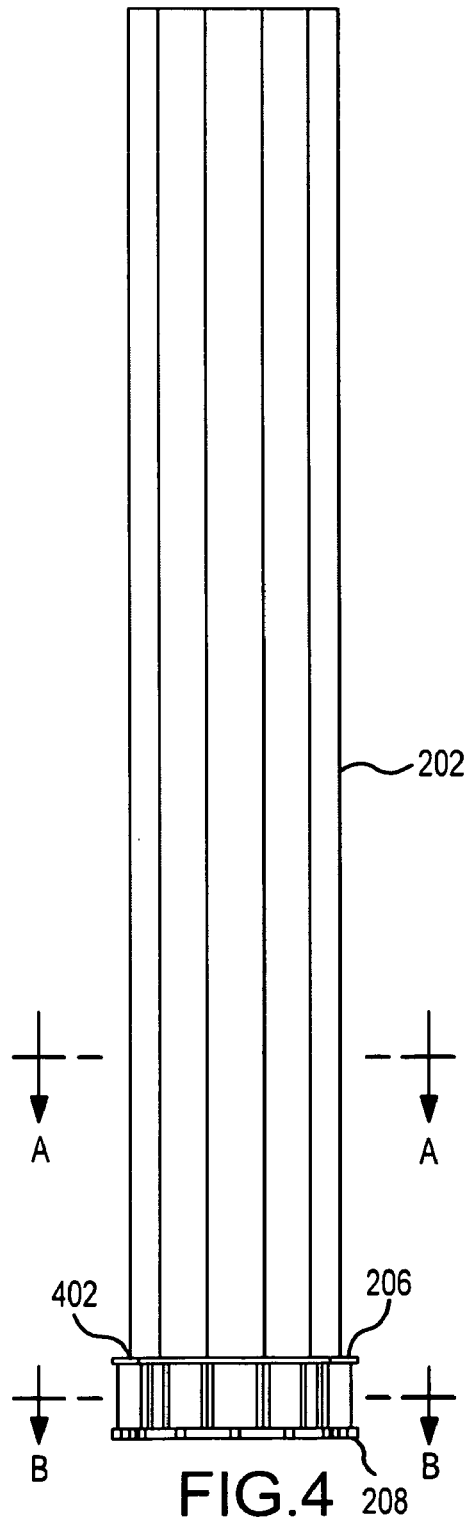
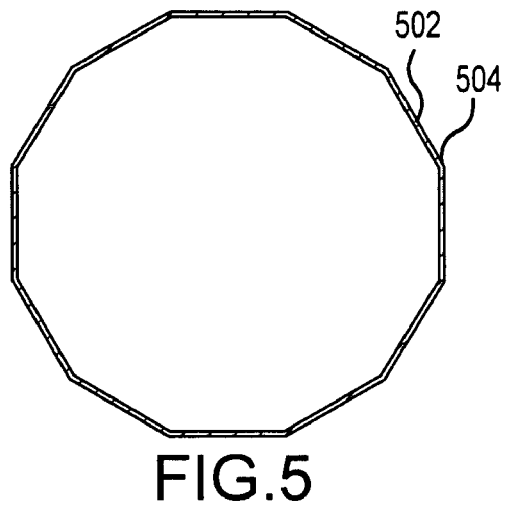
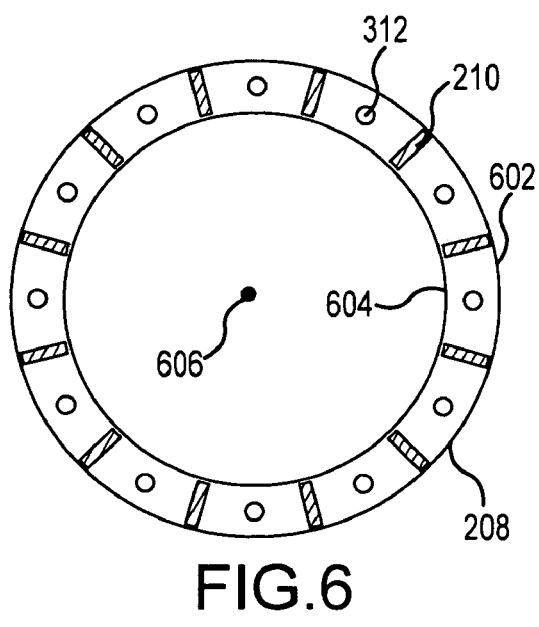

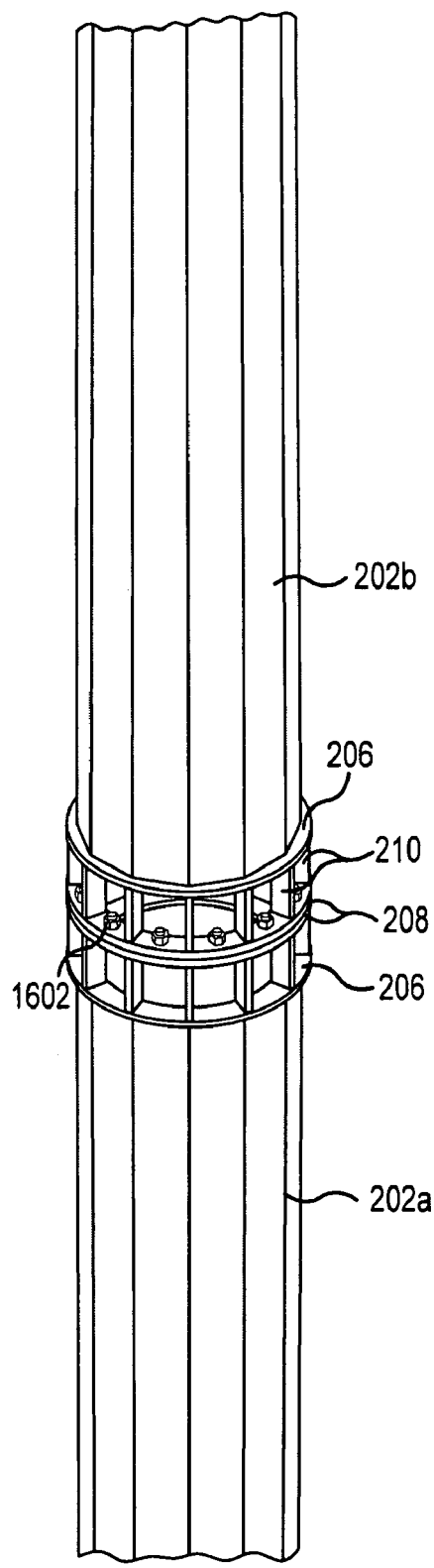
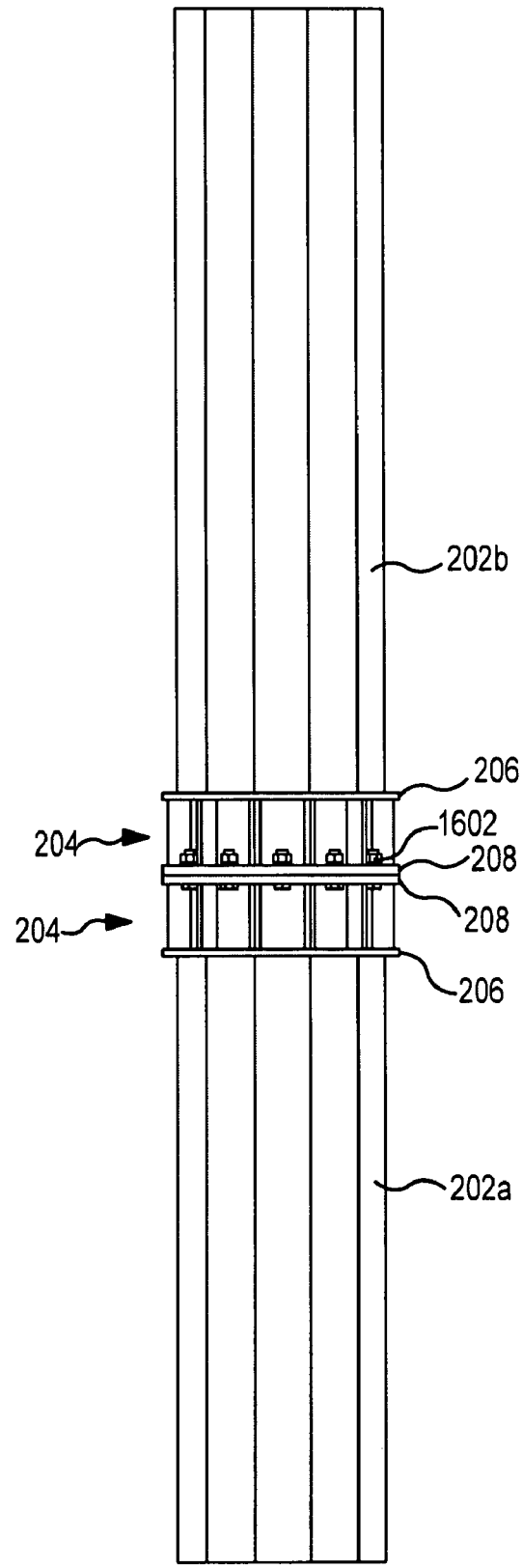
FIG.16
FIG.17

SYSTEMS AND METHODS FOR IN-LINE BASE PLATE TERMINATION IN MONOPOLE STRUCTURES

TECHNICAL FIELD

Embodiments of the present invention relate generally to monopole structures, and more particularly to end termination support and section splices for monopole structures.

BACKGROUND

Monopole structures typically house antennae and other communications equipment. Such structures often include a long, hollow pole structure which is connected to an underlying surface such as a concrete pad formed in the ground. Monopole structures are also used for other purposes, such as, for example, light fixtures, flag poles, and utility poles. As such, monopole structures are typically subjected to wind or other types of forces along their length, which bend or sway the monopole structures. These forces create a torque about the base termination, which in turn stresses the base termination location and can lead to fatigue and eventual failure of the base termination material.

Current monopole structures are often connected to an underlying concrete pad via a base termination plate with one or more flanges which protrude from the monopole structure. Bolts are often placed through the protruding flange of the base termination plate, and secured to the underlying pad. Placement of the bolts at a radial distance from the outside of the monopole structure (e.g. eccentric loading) enhances the torque experienced by the termination plate, increasing the stress distribution on the pole shaft just above the weld line. This secondary moment causing fatigue in the pole shaft can lead to a shorter life span with a higher risk of cracking at the welds and ultimate failure.

SUMMARY

An inline base plate termination system according to embodiments of the present invention includes an upper base plate configured to be joined to a bottom end of a monopole, a lower base plate substantially parallel to the upper base plate, the lower base plate having a plurality of bolt holes, and a plurality of web plates connecting the upper base plate with the lower base plate, wherein a virtual projection of the monopole through the lower base plate intersects the plurality of bolt holes. According to some embodiments of the present invention, each of the plurality of web plates is oriented radially with respect to an axial centerline of the monopole, and each of the plurality of bolt holes may be formed in the lower base plate at an equal distance from the axial centerline and evenly spaced circumferentially around the lower base plate. In some cases, each of the plurality of web plates connects to the lower base plate at a midpoint between two adjacent bolt holes of the plurality of bolt holes. In some instances, the monopole is hollow.

According to some embodiments of the present invention, the upper base plate may be joined to the bottom end of the monopole at a base perimeter, and a virtual projection of the base perimeter through the base plate intersects the plurality of bolt holes. According to other embodiments of the present invention, the virtual projection of the monopole through the lower base plate intersects a centerline of each of the plurality of bolt holes. In some cases, a cross section of the monopole may be a dodecagon with twelve sides of equal length joined at twelve angles of equal magnitude, the plurality of bolt holes is twelve bolt holes, the plurality of web plates is twelve web plates, and the virtual projection of the monopole through the lower base plate intersects each of the twelve web plates at one of the twelve angles and intersects each of the twelve bolt holes at a midpoint of one of the twelve sides. In other cases, a cross section of the monopole may be a polygon with sides of equal length joined at angles of equal magnitude, and the virtual projection of the monopole through the lower base plate intersects each of the plurality of web plates at one of the angles and intersects each of the plurality of bolt holes at a midpoint of one of the sides.

In some instances of the embodiments, the lower base plate is a circular ring with an outer edge and an inner edge, and each of the plurality of bolt holes is formed at a midpoint between the outer edge and the inner edge. Some embodiments of the present invention include an additional upper base plate configured to be joined to a top end of an additional monopole, an additional lower base plate substantially parallel to the additional upper base plate and including an additional plurality of bolt holes, an additional plurality of web plates connecting the additional upper base plate with the additional lower base plate, and an additional plurality of bolts connecting the first lower base plate with the additional lower base plate, such that the virtual projection also intersects the additional plurality of bolt holes.

Methods for monopole termination according to embodiments of the present invention include joining a monopole to an upper base plate, forming a plurality of bolt holes in a lower base plate, each of the plurality of bolt holes formed at an equal radial distance from a central axis of the monopole, and each of the plurality of bolt holes substantially evenly circumferentially spaced, joining each of a plurality of web plates to the lower base plate and the upper base plate, each of the plurality of web plates affixed to the lower base plate between two adjacent bolt holes of the plurality of bolt holes, and placing bolts through the plurality of bolt holes to join the lower base plate with a base platform, such that a virtual projection of the monopole through the lower base plate intersects the plurality of bolt holes. Methods according to such embodiments may further include deploying a cable through an access window between two adjacent web plates of the plurality of web plates and between the upper base plate and the lower base plate.

An inline base plate termination system according to embodiments of the present invention includes a monopole, a base plate joined to the monopole at a base perimeter, bolt holes formed in the base plate, the base perimeter intersecting the bolt holes, and bolt windows formed in the monopole over each of the bolt holes, the bolt windows permitting access to the bolt holes for insertion, removal, tightening, or loosening of bolts. An inline base plate termination system according to other embodiments of the present invention includes a monopole, a base plate having a top surface and a bottom surface, the top surface joined to the monopole at a base perimeter, and a plurality of support posts joined to the bottom surface, wherein a virtual projection of each of the plurality of support posts through the base plate intersects the base perimeter. An inline base plate termination system according to yet other embodiments of the present invention includes a hollow monopole having an outer shell, a base plate having a plurality of bolt holes formed therein, the plurality of bolt holes formed in a circular pattern and evenly circumferentially spaced, and a plurality of web plates, each of the plurality of web plates having an upper end and a lower end, the upper end having a longitudinal slot configured to receive and join with a bottom portion of the outer shell, the lower end joined to the base plate between two adjacent bolt holes of the plurality of bolt holes, wherein a virtual projection of the hollow monopole through the base plate intersects the plurality of bolt holes.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 4 illustrates a front elevation view of a monopole structure with an inline base termination assembly, according to embodiments of the present invention.

FIG. 5 illustrates a top cross-sectional view of the monopole structure of FIG. 4 taken along line A-A of FIG. 4, according to embodiments of the present invention.

FIG. 6 illustrates a top cross-sectional view of the base termination assembly of FIG. 4 taken along line B-B of FIG. 4, according to embodiments of the present invention.

FIG. 16 illustrates a front perspective view of a dual base termination assembly splicing together two monopole sections, according to embodiments of the present invention.

FIG. 17 illustrates a front elevation view of the dual base termination assembly of FIG. 16.

Figure 1A:
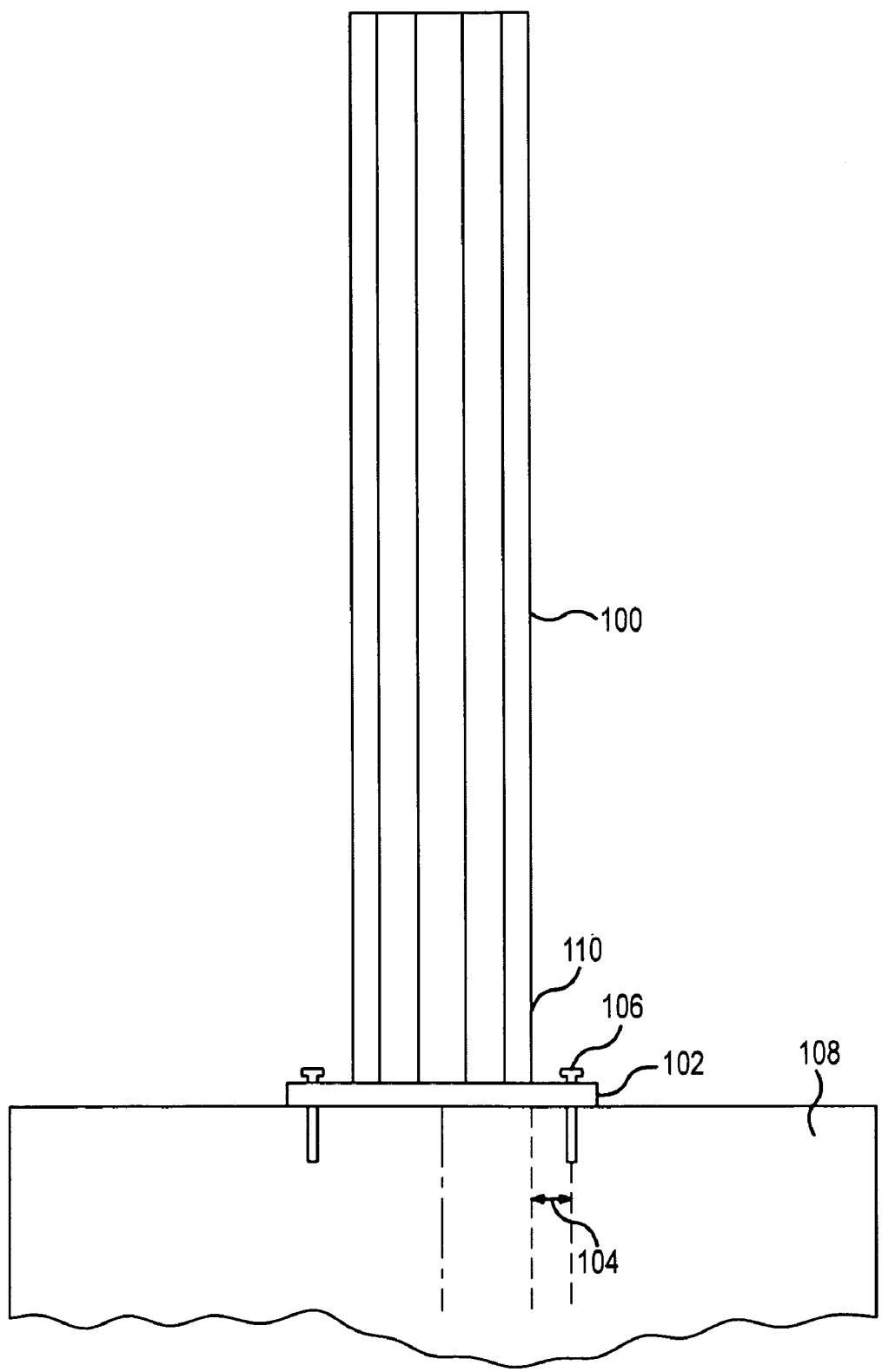
FIG. 1A illustrates a front elevation view of a monopole structure with an existing base plate termination.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 depicts a typical monopole structure 100 which is affixed to an existing base plate 102. Bolts 106 are placed through the base plate 102 and into the underlying base pad 108 at a distance 104 from the outer edge 110 of the monopole 100. This distance 104 enhances the torque experienced by the base plate 102 between the bolt 106 and the outer edge 110 due to lateral forces (e.g. wind) experienced by the monopole 100. This, in turn, often leads to warping and/or failure of the base of the monopole shell 110 over time at that location. However, the bolts 106 must be placed at a distance 104 from the outer edge 100 in such designs to permit adequate access for insertion, removal, tightening, and loosening of the bolts 106.

Figure 2:
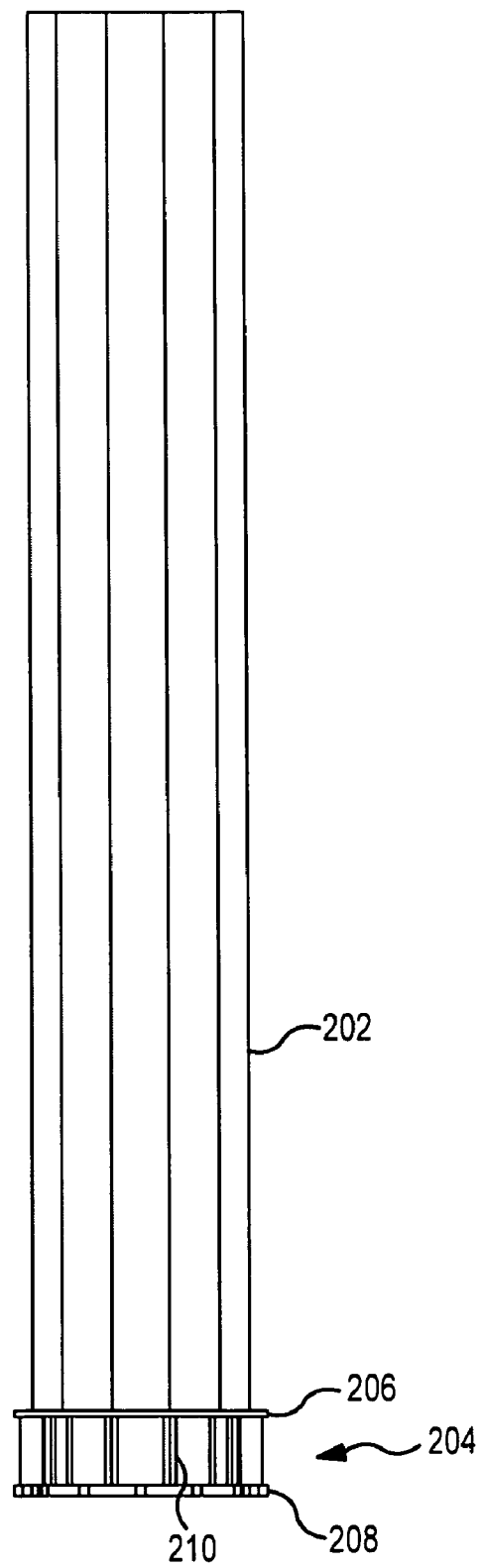
FIG. 2 illustrates a front elevation view of a monopole structure with an inline base termination assembly, according to embodiments of the present invention.
Figure 3:
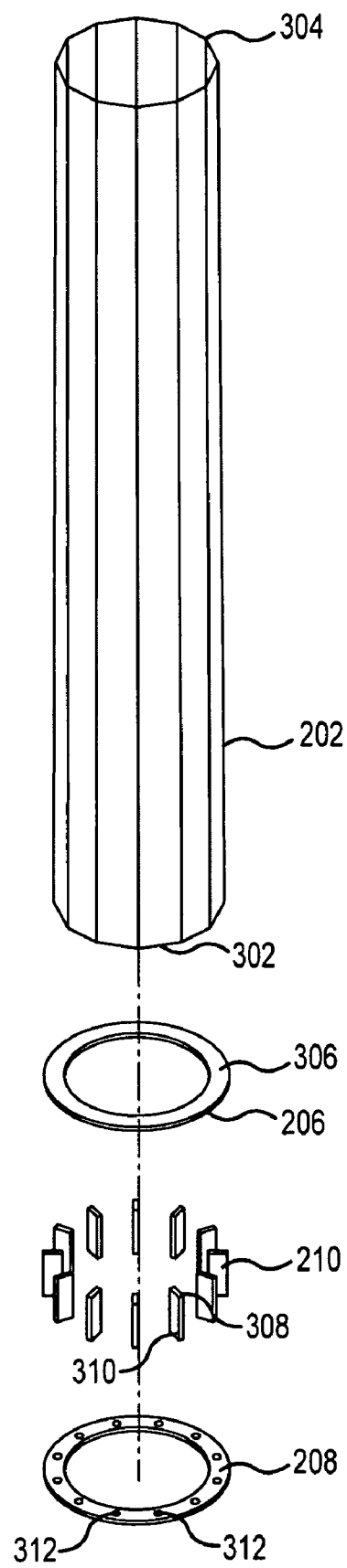
FIG. 3 illustrates an exploded view of the monopole structure with inline base termination assembly of FIG. 2, according to embodiments of the present invention.

FIGS. 2-7 illustrate a monopole 202 with a base termination assembly 204, according to embodiments of the present invention. As seen in FIGS. 2 and 3, the base termination assembly 204 includes an upper base plate 206 and a lower base plate 208 which are connected by web plates 210, according to embodiments of the present invention. The monopole 202 includes a top end 304 and a bottom end 302. The top side 306 of the upper base plate 206 is joined with the bottom end 302 of the monopole such as, for example, by welding, according to embodiments of the present invention. Each of the web plates 210 includes a top end 308 and a bottom end 310, with the top end 308 joined (e.g. welded) to the bottom side (not shown) of the upper base plate 206 and the bottom end 310 joined (e.g. welded) to the lower base plate 208, according to embodiments of the present invention. The lower base plate 208 includes bolt holes 312 formed therein, through which bolts may be inserted to attach the base termination assembly 204 to an underlying surface such as, for example, a concrete termination pad, according to embodiments of the present invention.

As shown in FIGS. 4-6, the monopole 202 is joined to the upper base plate 206 at a base perimeter 402. FIG. 5, which illustrates a cross-sectional view of the monopole 202 taken along line A-A of FIG. 4, shows that the cross section of the monopole may be a polygon with sides 502 of equal length joined by angles 504 of equal magnitude, according to embodiments of the present invention. For example, as depicted in FIG. 5, the monopole 202 shell may be a dodecagon with twelve sides 502 and twelve angles 504, according to embodiments of the present invention.

FIG. 6, which illustrates a cross-sectional view of the base termination assembly 204 taken along line B-B of FIG. 4, shows that the bolt holes 312 may be formed at an equal distance from the axial centerline 606 of the monopole 202, and that the bolt holes 312 may be evenly spaced circumferentially around the lower base plate 208, according to embodiments of the present invention. Similarly, the web plates 210 may be oriented radially with respect to the axial centerline 606 of the monopole 202, and connect to the lower base plate 208 at the midpoints between two adjacent bolt holes 312, according to embodiments of the present invention. Such a radially-symmetrical and evenly-spaced configuration for the bolt holes 312 and/or the web plates 210 imparts a higher degree of performance with concentric loading when compared to non-symmetrical and/or non-evenly spaced configurations. The lower base plate 208 may be formed as a ring which includes an outer edge 602 and an inner edge 604, and the bolt holes 312 may be formed in the lower base plate at a midpoint between the outer edge 602 and the inner edge 604, as depicted in FIG. 6, according to embodiments of the present invention.

Figure 7:
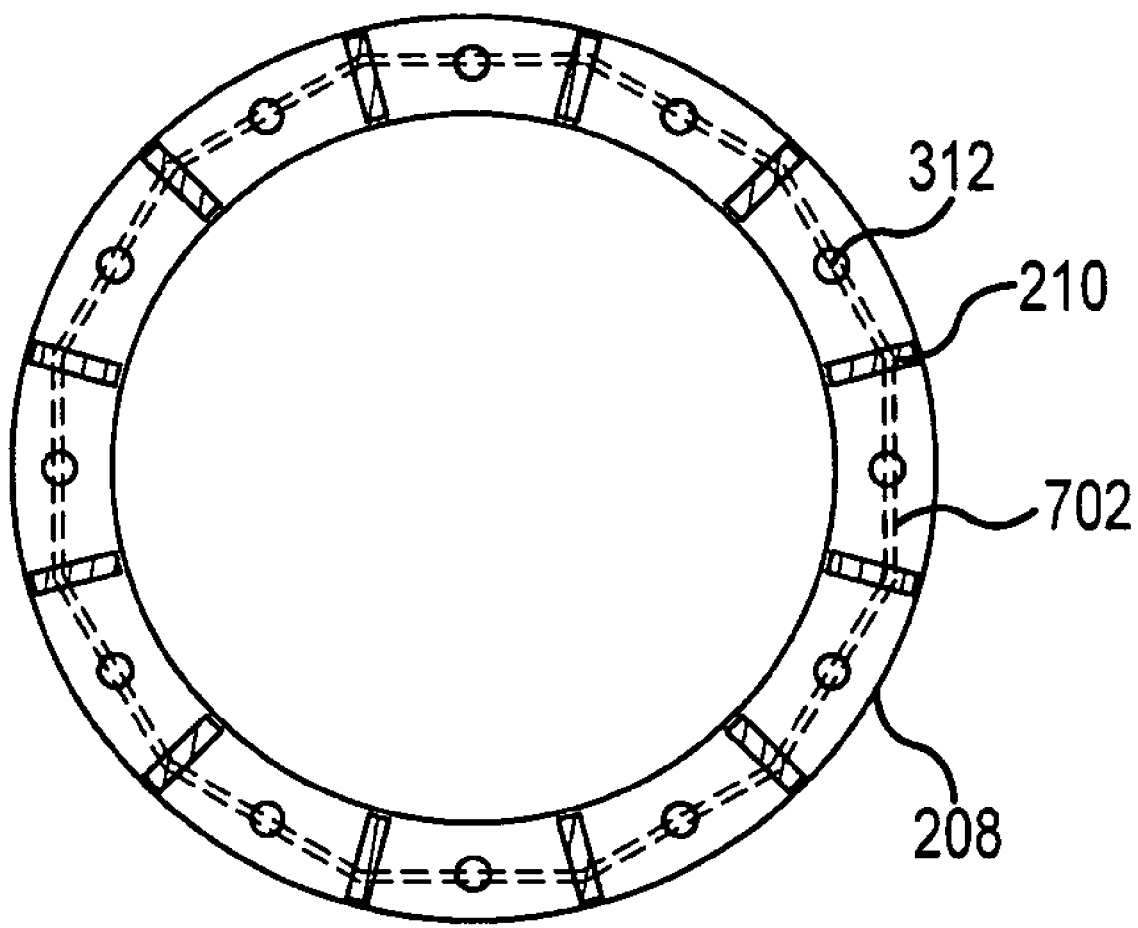
FIG. 7 illustrates the top cross-sectional view of FIG. 6 with a virtual projection of the monopole, according to embodiments of the present invention.

FIG. 7 illustrates a virtual projection 702 of the monopole 202 through the lower base plate 208, according to embodiments of the present invention. Though not a literal projection or extension, a virtual projection 702 of the monopole 202 illustrates a superimposition of the cross-section of the monopole 202 as depicted in FIG. 5 onto the view of FIG. 6 as if the monopole 202 shell had been extended lengthwise through the upper base plate 206 and lower base plate 208, according to embodiments of the present invention.

As can be seen in FIG. 7, the virtual projection 702 intersects the bolt holes 312; in addition, the corners 504 of the virtual projection 702 intersect the web plates 210 and the bolt holes 312 are intersected by the virtual projection 702 at the midpoint of the sides 502, according to embodiments of the present invention. The bolt holes 312, and thus the bolts placed through them, are therefore in-line with the monopole 202 structure. Such a configuration eliminates the moment arm created by placing the bolts at a distance from the monopole 202 shell, and reduces or eliminates warping and fatigue failure of the monopole 202 shell at the base termination location, according to embodiments of the present invention. Such a configuration also permits easy access to the bolt hole 312 location for the insertion, removal, tightening, and/or loosening of the bolts, according to embodiments of the present invention. The bolt holes 312 may be accessed between adjacent web plates 210 and between the upper base plate 206 and lower base plate 208, according to embodiments of the present invention.

Figure 1B:
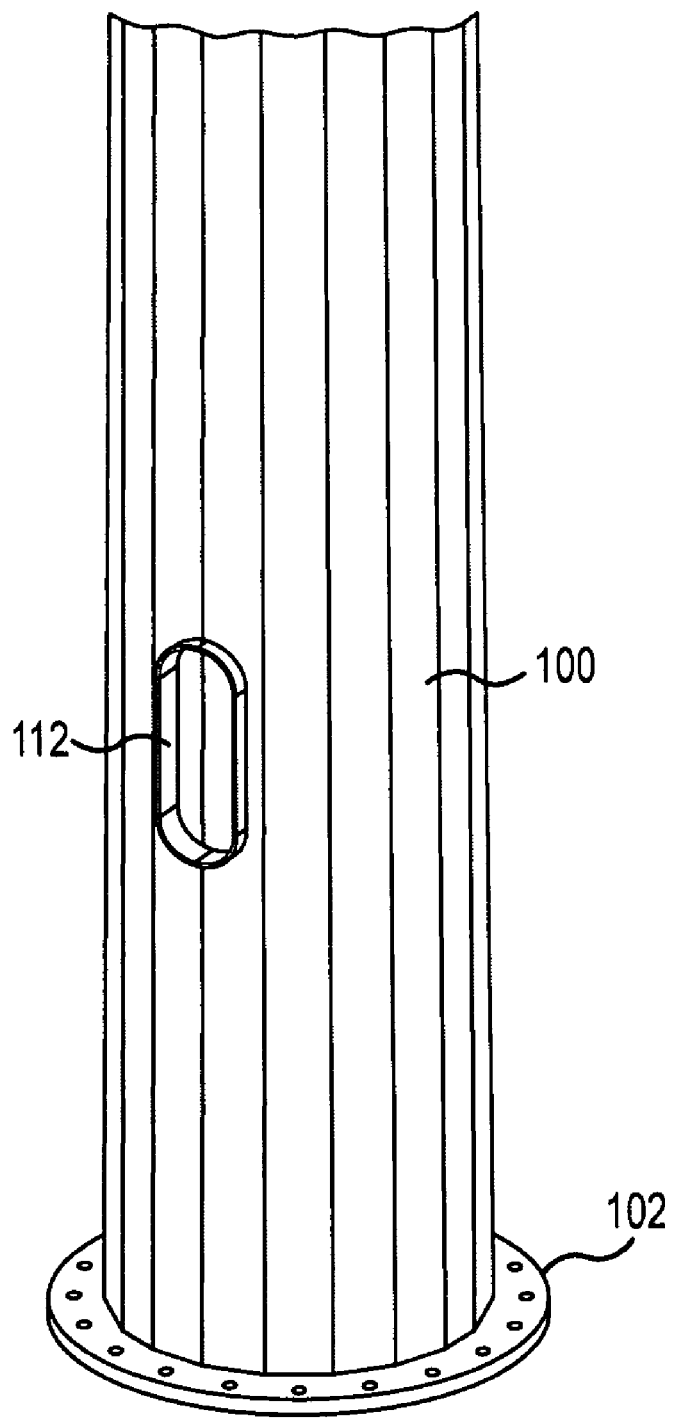
FIG. 1B illustrates a front perspective view of a monopole structure with an access port formed therein.

The bolt hole 312 access windows of the base termination assembly 204 also provide a portal through which cables and/or wires may be passed. Without such access windows, holes would otherwise need to be created in the side of the monopole 202, further weakening its structure. FIG. 1B illustrates a perspective view of a monopole 100 in which an access window 112 is formed. According to some embodiments of the present invention, the access windows between adjacent web plates 210 also permit inspection or other physical access to the inside of the monopole 202 without compromising its structure and/or symmetry.

Figure 8:
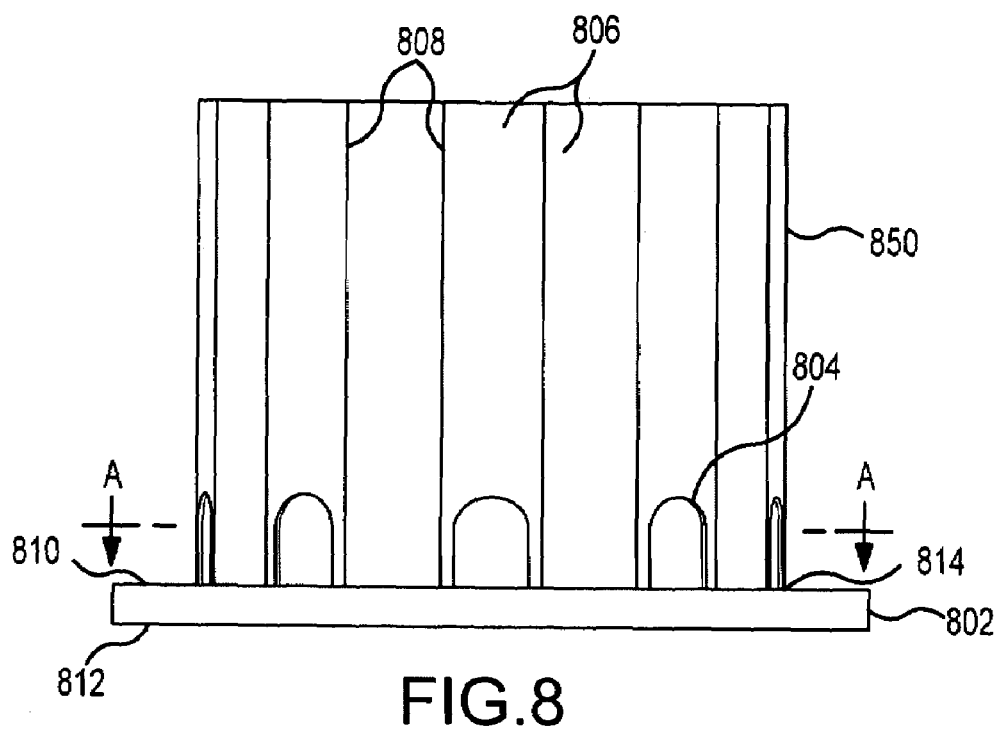
FIG. 8 illustrates a front elevation view of a monopole with an alternative base termination, according to embodiments of the present invention.
Figure 9:
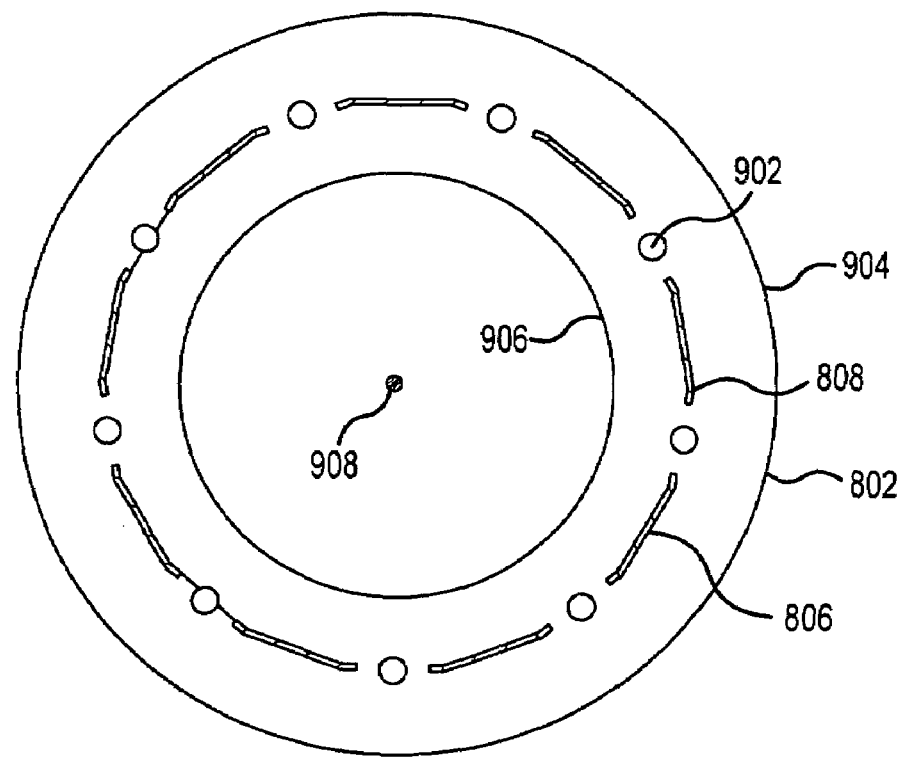
FIG. 9 illustrates a top cross-sectional view of the monopole with alternative base termination of FIG. 8, taken along line A-A of FIG. 8, according to embodiments of the present invention.
Figure 10:
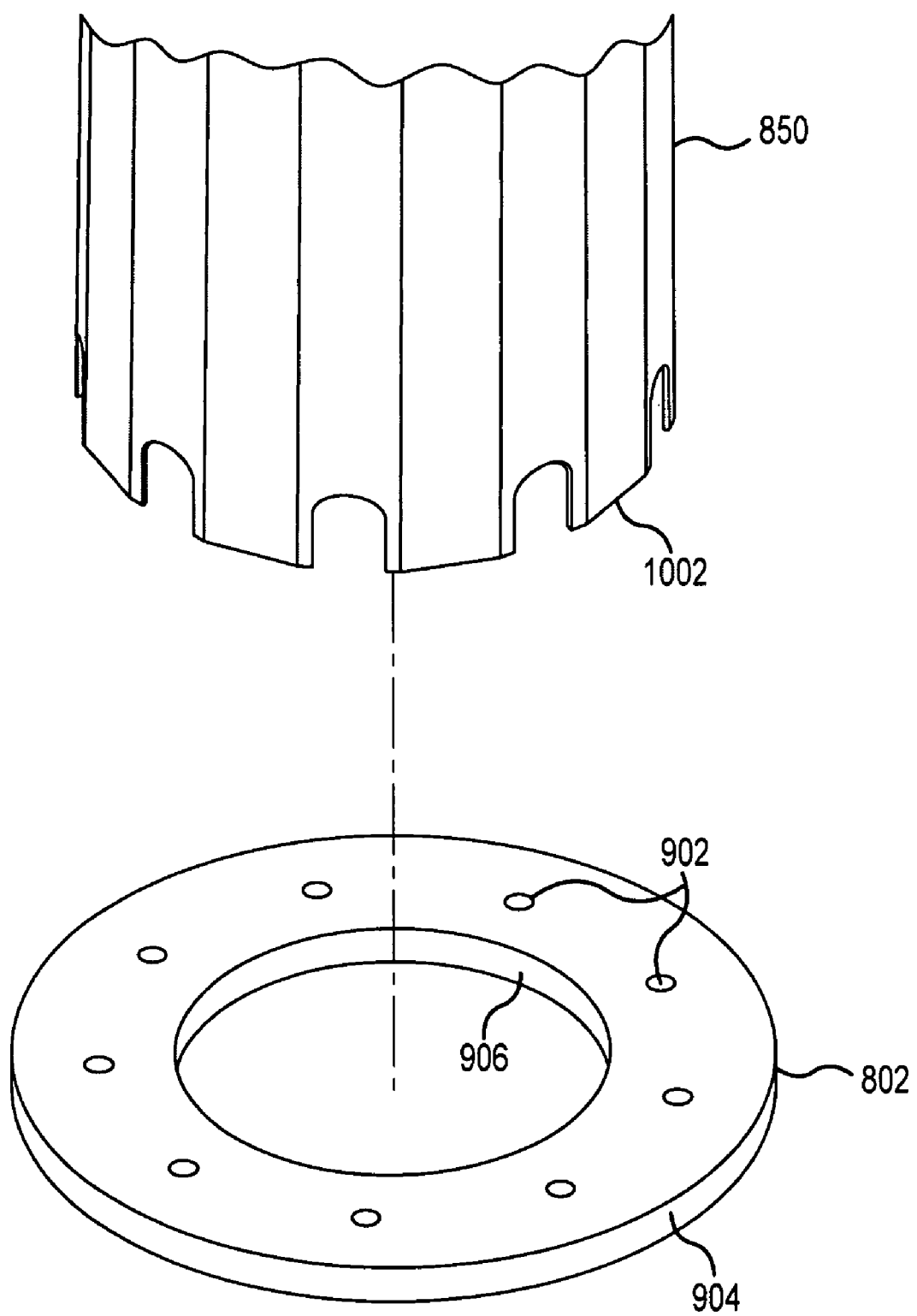
FIG. 10 illustrates an exploded perspective view of the monopole with alternative base termination of FIGS. 8 and 9, according to embodiments of the present invention.

FIG. 8-10 illustrate an alternative base plate 802, according to embodiments of the present invention. The monopole 202 includes a number of sides 806 of equal length connected at angles 808 of equal magnitude. The base plate 802 includes a top surface 810 and a bottom surface 812, and the top surface 810 is joined to a bottom edge 1002 of the monopole 202 at a base perimeter 814, according to embodiments of the present invention.

FIG. 9 illustrates a cross-sectional view of the monopole 850 and the base plate 802 taken along line A-A of FIG. 8. The cross-section of monopole 850, as depicted, is an octadecagon which includes eighteen sides 806 and eighteen angles 808. The monopole 850 includes bolt windows 804 formed above each of the bolt holes 902, according to embodiments of the present invention. The bolt holes 902 are formed in the base plate 802 and, as seen in FIG. 9, a virtual projection of the monopole 850 through the base plate 802 intersects each of the bolt holes 902, according to embodiments of the present invention. The base plate 802 includes an outer edge 904 and an inner edge 906, and the bolt holes 902 are formed in the base plate 802 between the outer edge 904 and inner edge 906, at an equal radial distance from an axial centerline 908 of the monopole 850, and evenly circumferentially spaced as shown in FIG. 9, according to embodiments of the present invention.

The bolt holes 902, and thus the bolts placed through them, are therefore in-line with the monopole 850 structure. Such a configuration eliminates the moment arm created by placing the bolts at a distance from the monopole 850 shell, and reduces warping and fatigue failure at the base termination location, according to embodiments of the present invention. Including bolt windows 804 also permits easy access to the bolt hole 902 location for the insertion, removal, tightening, and/or loosening of the bolts, according to embodiments of the present invention. The bolt windows 804 may be formed in an arch-shape, a door-shape, or any other shape which permits access to the bolt and/or bolt hole 902. Forming a number of bolt holes 902 in the base plate which corresponds to half the number of sides in the cross-sectional polygon of the monopole 850 permits formation of the bolt windows 804 in every second side 806, for increased structural stability, according to embodiments of the present invention.

The bolt windows 804 also provide a portal through which cables and/or wires may be passed. Without such access windows 804, holes would otherwise need to be created in the side of the monopole 850, further weakening its structure. According to some embodiments of the present invention, the bolt windows 804 also permit inspection or other physical access to the inside of the monopole 850 without compromising its structure and/or symmetry.

Figure 11:
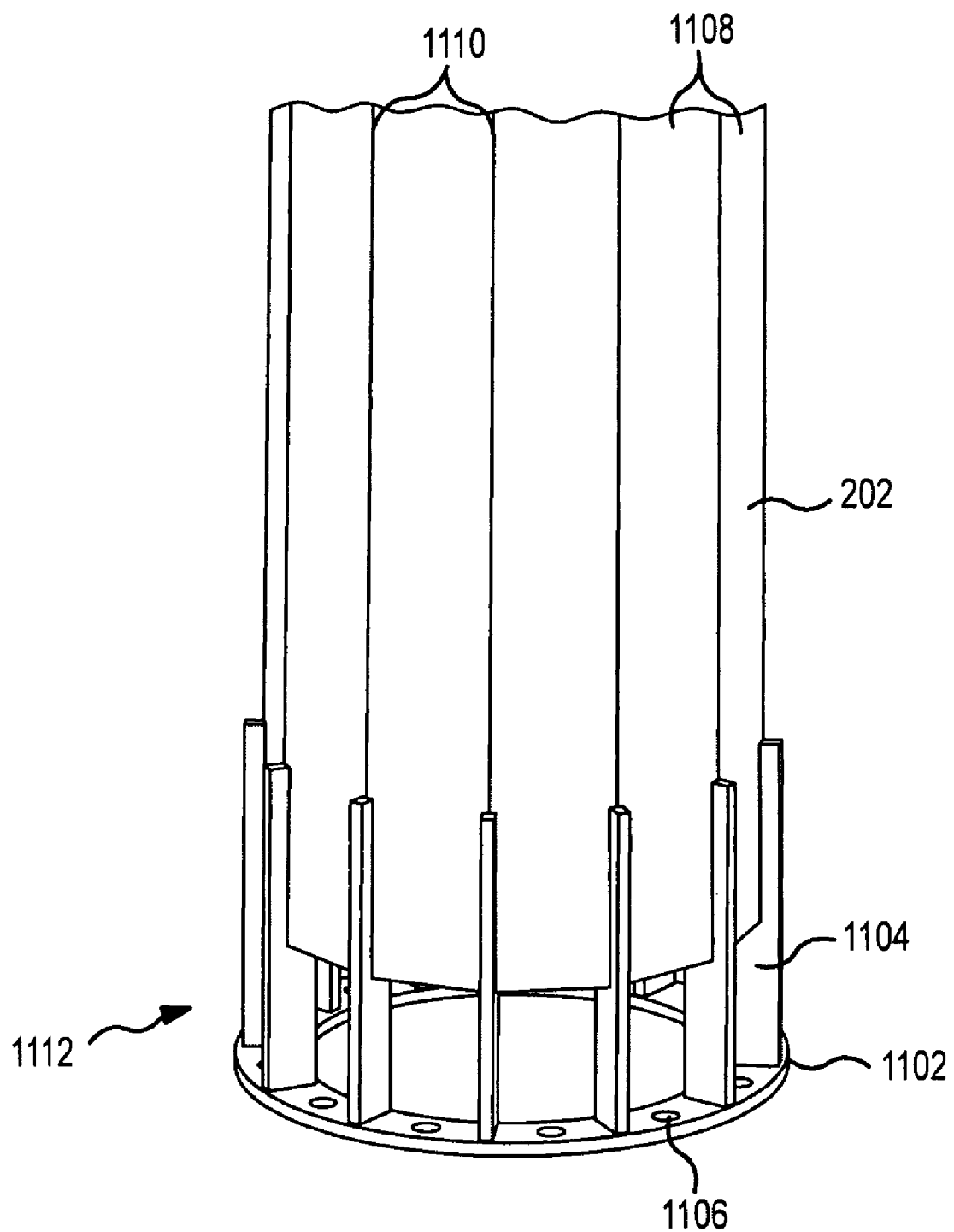
FIG. 11 illustrates a front perspective view of a monopole with yet another alternative embodiment of an inline base termination assembly, according to embodiments of the present invention.
Figure 12:
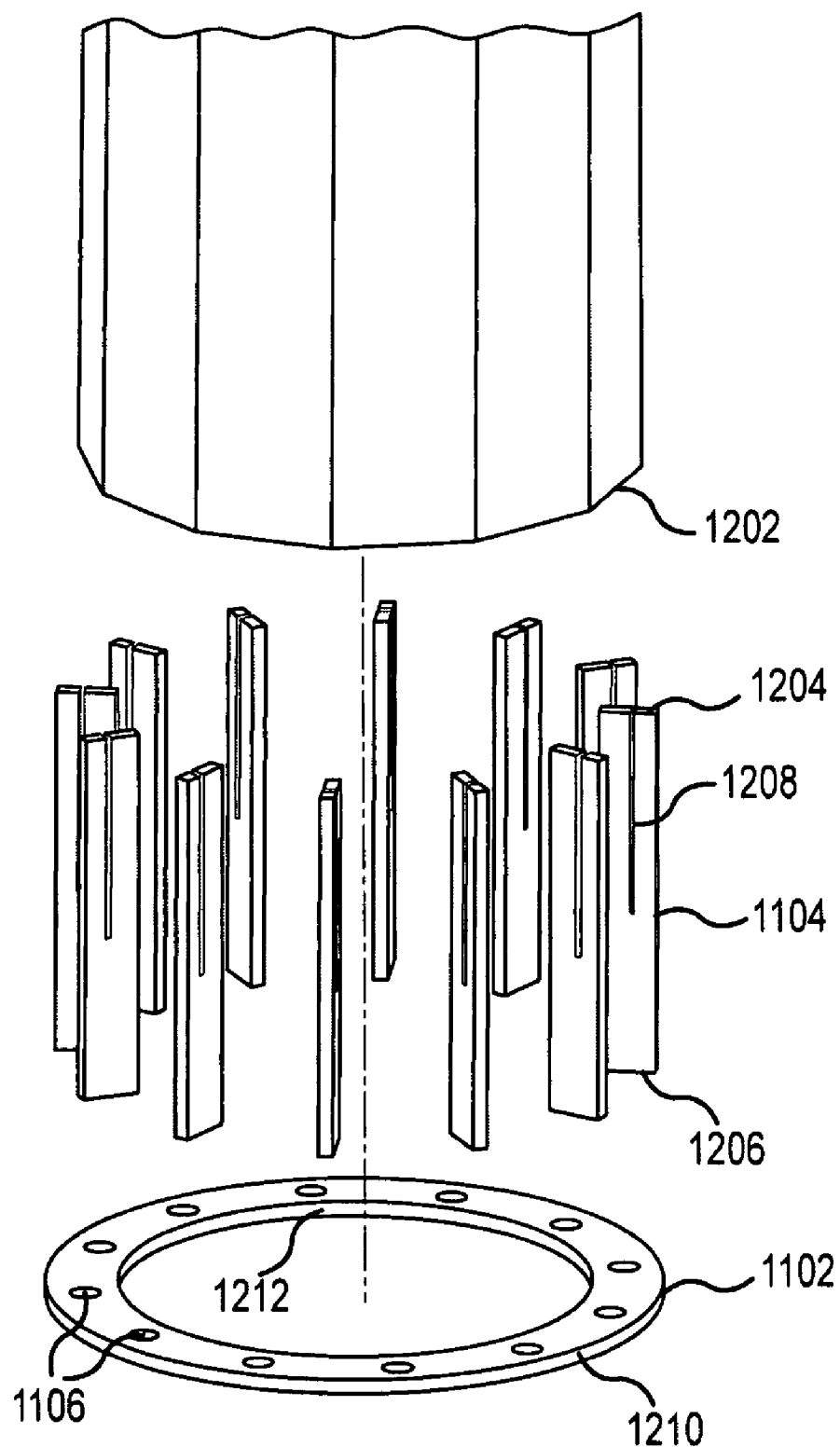
FIG. 12 illustrates an exploded front perspective view of the monopole and inline base termination assembly of FIG. 11, according to embodiments of the present invention.

FIGS. 11 and 12 illustrate an alternative embodiment of a base termination assembly 1112, according to embodiments of the present invention. The monopole 202 shell may be a dodecagon with twelve sides 1108 and twelve angles 1110, according to embodiments of the present invention. Web plates 1104 may be used to join the bottom end 1202 of the monopole 202 with a base plate 1102, according to embodiments of the present invention. Each of the web plates 1104 includes a top end 1204 and a bottom end 1206, and a notch or groove or longitudinal slot 1208 extends into the web plate 1104 from the top end 1204, according to embodiments of the present invention. The slot 1208 is configured to receive the bottom end 1202 of the monopole 202. The base plate 1102, which includes an outer edge 1210 and an inner edge 1212, has bolt holes 1106 formed therein.

FIG. 12 depicts an exploded view of the monopole 202 and base termination assembly 1112, according to embodiments of the present invention. The bottom edge 1212 of the monopole 202 may be inserted into the slots 1208, and the web plates 1104 may be welded to the monopole 202 along the slots 1208, according to embodiments of the present invention.

A cross-sectional view of the base termination assembly 1112 taken below the monopole 202 is much the same as the view of FIG. 6, according to embodiments of the present invention. The bolt holes 1106 may be formed at an equal distance from the axial centerline of the monopole 202, and the bolt holes 1106 may be evenly spaced circumferentially around the base plate 1102, according to embodiments of the present invention. Similarly, the web plates 1104 may be oriented radially with respect to the axial centerline of the monopole 202, and connect to the base plate 1102 at the midpoints between two adjacent bolt holes 1106, according to embodiments of the present invention. Such a radially-symmetrical and evenly-spaced configuration for the bolt holes 1106 and/or the web plates 1104 imparts a higher degree of performance when compared to non-symmetrical and/or non-evenly spaced configurations. The base plate 1102 may be formed as a ring which includes an outer edge 1210 and an inner edge 1212, and the bolt holes 1106 may be formed in the base plate 1102 at a midpoint between the outer edge 1210 and the inner edge 1212, according to embodiments of the present invention.

As in FIG. 6, the virtual projection of the monopole 202 through the base plate 1106 intersects the bolt holes 1106; in addition, the corners 1110 of the virtual projection intersect the web plates 1104 and the bolt holes 1106 are intersected by the virtual projection at the midpoint of the sides 1108, according to embodiments of the present invention. The bolt holes 1106, and thus the bolts placed through them, are therefore in-line with the monopole 202 structure. Such a configuration eliminates the moment arm created by placing the bolts at a distance from the monopole 202 shell, and reduces warping and fatigue failure at the base termination location, according to embodiments of the present invention. Such a configuration also permits easy access to the bolt hole 1106 location for the insertion, removal, tightening, and/or loosening of the bolts, according to embodiments of the present invention. The bolt holes 1106 may be accessed between adjacent web plates 1104 and between the bottom edge 1202 of the monopole 202 and the base plate 1102, according to embodiments of the present invention.

Figure 13:
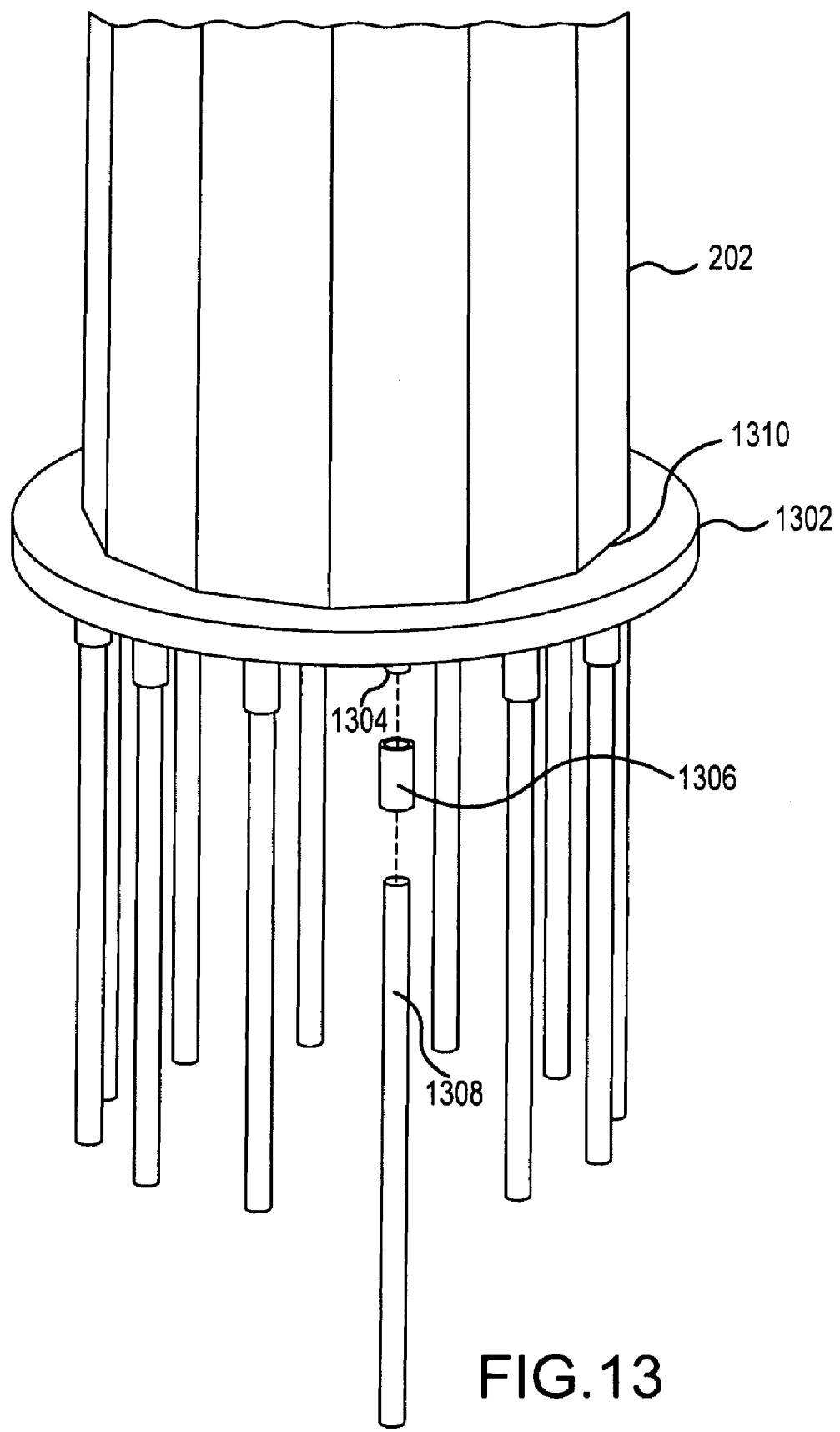
FIG. 13 illustrates a front perspective view of a monopole with an additional alternative embodiment of an inline base termination, according to embodiments of the present invention.
Figure 14:
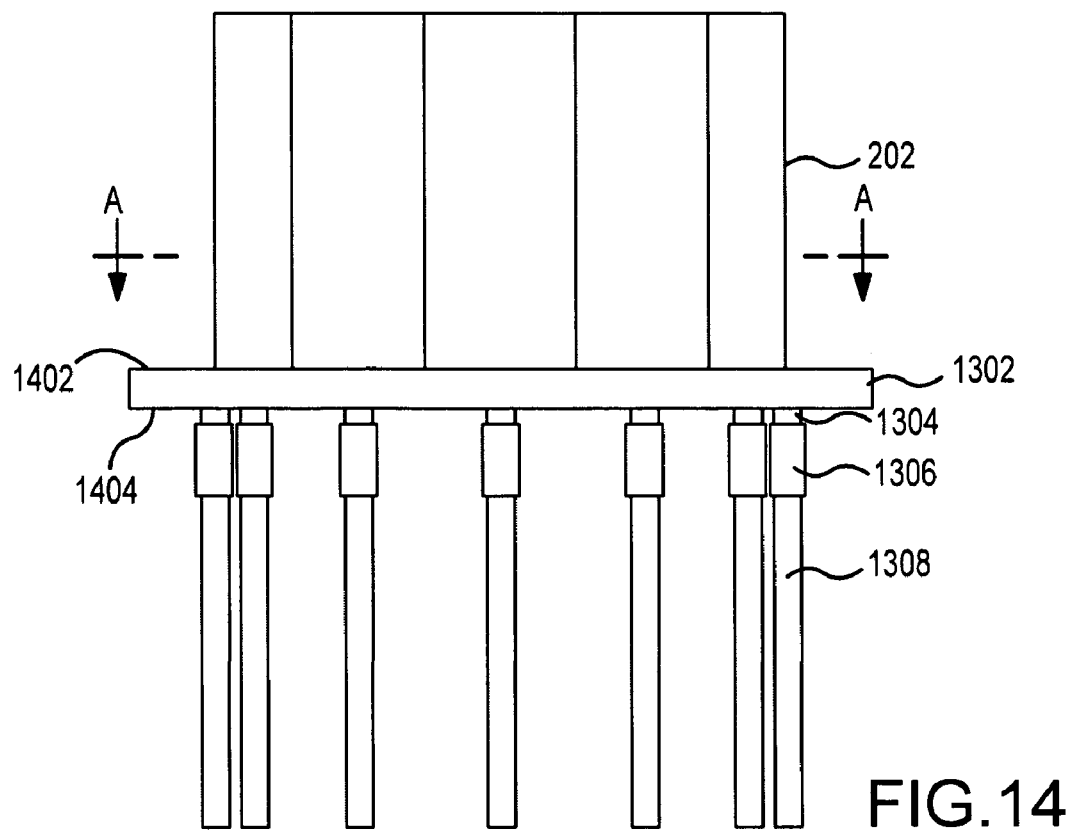
FIG. 14 illustrates a front elevation view of the monopole and inline base termination of FIG. 13, according to embodiments of the present invention.
Figure 15:
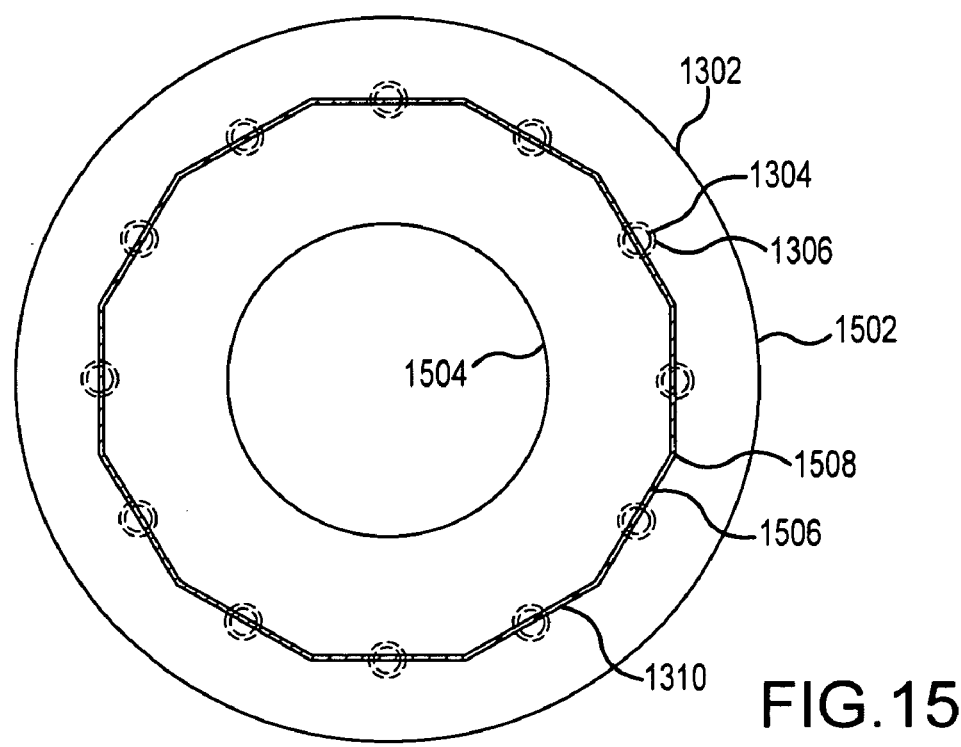
FIG. 15 illustrates a top cross-sectional view of the monopole and base plate of FIG. 14, taken along line A-A of FIG. 14, according to embodiments of the present invention.

FIGS. 13-15 illustrate yet another alternative embodiment of the present invention. A monopole 202 is joined with a base plate 1302 around a base perimeter 1310 at the top surface 1402 of the base plate 1302, according to embodiments of the present invention. On the bottom surface 1404 of the base plate 1302, support posts 1304 are joined with the base plate 1302. The base plate 1302 has an outer edge 1502 and an inner edge 1504, according to embodiments of the present invention. The support posts may be configured for joining with support columns 1308. For example, an outer surface of each support post 1304 and each support column 1308 may be configured to threadably engage a connection nut 1306, as illustrated in FIGS. 13 and 14.

According to some embodiments of the present invention, the support columns 1308 may be arranged and/or embedded within an underlying surface, such as, for example, a concrete base termination pad. The support columns 1308 may be arranged in a pre-formed pattern selected to match the pattern of the support posts 1304 joined to the bottom surface 1404 of the base plate 1302. The monopole 202 with base plate 1302 may then be positioned over the pre-formed pattern of support columns 1308, and the support posts 1304 may be coupled with the support columns 1308, such as, for example, by threaded nuts 1306, according to embodiments of the present invention.

As illustrated in FIG. 15, a virtual projection of each of the support posts 1304 through the base plate 1502 intersects the monopole 202 and the base perimeter 1310 of the monopole 202, according to embodiments of the present invention. As depicted in FIG. 15, the monopole may be a dodecagon with twelve equal sides 1506 and twelve equal corners 1508, and the base plate 1302 may include twelve support posts 1304 each joined to the bottom surface 1404 of the base plate 1302 at a midpoint of each of the sides 1506, according to embodiments of the present invention. Such a configuration places the support posts 1304 in-line with the monopole 202 structure, according to embodiments of the present invention. Such a configuration also eliminates the moment arm created by placing the bolts and/or support posts 1304 at a distance from the monopole 202 shell, and reduces warping and fatigue failure at the base termination location, according to embodiments of the present invention. Such a configuration also permits easy access to the support posts 1304 for facilitated attachment, detachment, tightening, and/or loosening of the nuts 1306 and/or the support columns 1308, according to embodiments of the present invention.

Although inline base termination embodiments have been discussed in connection with monopole structures which are dodecagons and octadecagons, one of ordinary skill in the art, based on the disclosure herein, will appreciate that similar inline base termination structures may be employed for monopole structures which are round, square, or which have cross sections of varying shapes and sizes, or which have cross sections that are radially asymmetrical, according to embodiments of the present invention. The structure components described herein may be made of any suitable material. For example, the monopoles, base plates, and web plates may be formed of steel, according to embodiments of the present invention. As used herein, the term "joined" is used in its broadest sense to refer to two elements which are connected. For example, two elements may be joined, coupled, attached, connected, or affixed to one another by welding the two elements together, according to embodiments of the present invention.

The bolts used for insertion through bolt holes are selected to meet the overturning moment of the monopole shaft 202, according to embodiments of the present invention. For example, assuming that the monopole 202 has a diameter of 45.5 inches (bolt circle, $B_C$); that the number of bolts equals the number of sides which also equals the number of web plates 210, which equals eighteen; that the same geometry will be used for the top and bottom base plates 206, 208; that the base plates 206, 208 are separated by twelve inches; that the monopole wall 202 is three-eighths inches thick; that $M_{max}$, the maximum moment experienced by the monopole 202, is 2145.1 kip-feet; and that the maximum axial force $F_A$ of the monopole 202 is 20.5 kip; the following procedure may be used to select anchor bolts, the width and thickness of the top and bottom base plates 206, 208, and the spacing and thickness of the web plates 210. The maximum tension on the anchor bolts, $T_{maxAB}$, may be found with the following equation:

$$T_{max\,AB} = \frac{4 \times M_{max} \times 12}{\#\ of bolts \times B_C} \pm \frac{F_A}{\#\ of bolts} \quad \text{(Eq. 1)}$$

Solving the equation with the above-referenced values yields a solution of 126.84 kips or 124.56 kips, the higher of which is used to determine the required bolt size, according to embodiments of the present invention. The required bolt area, AE, may be found with the following equation:

$$AE = \frac{T_{max\,AB}}{[USDfactor] \times 0.6 \times F_{yAB}} \quad \text{(Eq. 2)}$$

Assuming a USDfactor of 1.333 and a value for $F_{yAB}$ of 75 ksi yields a result for AE of 2.11 square inches. The bolt diameter $F_{AB}$ required may be found with the following equation:

$$F_{AB} = \sqrt{\frac{AE}{0.7854}} + \frac{0.9743}{n} \quad \text{(Eq. 3)}$$

where n is equal to the number of threads per inch, and which for purposes of this example is assumed to be equal to 4.5. Using these values, $F_{AB}$ is found to be 1.86 inches. Rounding up to the nearest quarter inch, the bolt diameter may be selected as 2.0 inches.

Continuing the example, the width b of the top and bottom base plates 206, 208 between the outer 602 and inner 604 diameter may be found with the following equation:

$$b = F_{AB} + 2(F_{AB}) \quad \text{(Eq. 4)}$$

which results in a value for b of 6.0 inches. The circumferential spacing L of the web plates 210 may be found with the following equation:

$$L = \frac{B_C \times \pi}{\# \text{ ofsides}} \quad \text{(Eq. 5)}$$

Thus, the circumferential spacing of the web plates is 7.94 inches, according to the particular example described. The thickness $h_{BP}$ of the top 206 and bottom 208 base plates may be determined with the following equation:

$$h_{BP} = \sqrt{\frac{3 \times T_{max\ AB} \times L}{4 \times b \times F_{yPL} \times [USDfactor] \times 0.6}} \quad \text{(Eq. 6)}$$

where $F_{yPL}$ is assumed to be 50 ksi yield, which results in a value for $h_{BP}$ of 1.77 inches. Rounded up to the nearest quarter inch, $h_{BP}$ is equal to 2.0 inches. The thickness $h_{ST}$ of the web plates 210 may be found with the following equation:

$$h_{ST} = \frac{T_{max\ AB}}{[USDfactor] \times 0.6 \times F_{yST} \times b} \times B_{factor} \quad \text{(Eq. 7)}$$

where the bending factor in compression, $B_{factor}$, is assumed to be 1.75. Using the values from above results in a value for $h_{ST}$ of 0.93 inches which, rounded up to the nearest eighth inch, is 1.0 inches. Based on the disclosure provided herein, one of ordinary skill in the art will appreciate the various sizes and configurations that may be used for the base plates 206, 208, anchor bolts, and web plates 210, according to embodiments of the present invention.

Although some embodiments of the present invention are described with respect to web plates 210 which are oriented radially with respect to the axial centerline 606 of the monopole 202 (see FIG. 6), one of ordinary skill in the art, based on the disclosure provided herein, will appreciate that the web plates 210 may be oriented at an angle with respect to a radius of the base plate 208. For example, the web plates 210 may be oriented at an angle of ten degrees with respect to a radius of the base plate 208, while still providing similar support characteristics and access to the inside of the monopole 202, according to embodiments of the present invention.

As illustrated in FIGS. 16 and 17, a base termination assembly 204 may also be used to splice a termination end of one monopole section 202a with a termination end of another monopole section 202b, according to embodiments of the present invention. Such a configuration may be used to add an additional monopole section 202b onto an existing monopole 202a, and/or to assemble a monopole which has been prefabricated in sections 202a, 202b, according to embodiments of the present invention. A base termination assembly 204 may be joined to one of the monopole sections 202a, and another base termination assembly may be joined to the other monopole section 202b, and the base plates 208 of each base termination assembly 204 may be bolted together using bolts 1602, according to embodiments of the present invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. An apparatus, comprising:
   a monopole, wherein a cross section of the monopole is a polygon with sides of equal length joined at angles of equal magnitude;
   an upper base plate joined to a bottom end of the monopole;
   a lower base plate substantially parallel to the upper base plate, the lower base plate comprising a plurality of bolt holes; and
   a plurality of web plates connecting the upper base plate with the lower base plate,
   wherein a virtual projection of the monopole through the lower base plate intersects the plurality of bolt holes.

2. The apparatus of claim 1, wherein each of the plurality of web plates is oriented radially with respect to an axial centerline of the monopole.

3. The apparatus of claim 2, wherein each of the plurality of bolt holes is formed in the lower base plate at an equal distance from the axial centerline and is evenly spaced circumferentially around the lower base plate.

4. The apparatus of claim 3, wherein each of the plurality of web plates connects to the lower base plate at a midpoint between two adjacent bolt holes of the plurality of bolt holes.

5. The apparatus of claim 1, wherein the monopole is hollow.

6. The apparatus of claim 1, wherein the virtual projection of the monopole through the lower base plate intersects a centerline of each of the plurality of bolt holes.

7. The apparatus of claim 1, wherein the monopole is a dodecagon with twelve sides of equal length joined at twelve angles of equal magnitude, wherein the plurality of bolt holes is twelve bolt holes, wherein the plurality of web plates is twelve web plates, and wherein the virtual projection of the monopole through the lower base plate intersects each of the twelve web plates at one of the twelve angles and intersects each of the twelve bolt holes at a midpoint of one of the twelve sides.

8. The apparatus of claim 1, wherein wherein the virtual projection of the monopole through the lower base plate intersects each of the plurality of web plates at one of the angles and intersects each of the plurality of bolt holes at a midpoint of one of the sides.

9. The apparatus of claim 1, wherein the lower base plate is a circular ring with an outer edge and an inner edge, and wherein each of the plurality of bolt holes is formed at a midpoint between the outer edge and the inner edge.

10. The apparatus of claim 1, wherein the upper base plate is a first upper base plate, wherein the lower base plate is a first lower base plate, wherein the monopole is a first monopole, wherein the plurality of bolt holes is a first plurality of bolt holes, and wherein the plurality of web plates is a first plurality of web plates, the apparatus further comprising:

a second upper base plate configured to be joined to a top end of a second monopole;

a second lower base plate substantially parallel to the second upper base plate, the second lower base plate comprising a second plurality of bolt holes; and a second plurality of web plates connecting the second upper base plate with the second lower base plate; and a plurality of bolts connecting the first lower base plate with the second lower base plate, wherein the virtual projection intersects the second plurality of bolt holes.

11. An apparatus, comprising:

a monopole;

an upper base plate configured to be joined to a bottom end of the monopole;

a lower base plate substantially parallel to the upper base plate, the lower base plate comprising a plurality of bolt holes; and a plurality of web plates connecting the upper base plate with the lower base plate, wherein a virtual projection of the monopole through the lower base plate intersects the plurality of bolt holes, and wherein an access window formed between the upper and lower base plates and at least two of the plurality of web plates permits access to an inside of the monopole.

12. The apparatus of claim 11, wherein the lower base plate is a circular ring with an outer edge and an inner edge, and wherein each of the plurality of bolt holes is formed at a midpoint between the outer edge and the inner edge.

13. The apparatus of claim 11, wherein the access window is formed between the upper and lower base plates and between each adjacent web plate of the plurality of web plates.

14. The apparatus of claim 1, further comprising an access window formed between the upper and lower base plates and at least two of the plurality of web plates, wherein the access window permits access to an inside of the monopole.

* * * * *

UNITED STATES PATENT AND TRADEMARK OFFICE
CERTIFICATE OF CORRECTION

PATENT NO. : 7,694,476 B2 Page 1 of 1
APPLICATION NO. : 12/040799
DATED : April 13, 2010
INVENTOR(S) : Bradley J. Cook et al.

It is certified that error appears in the above-identified patent and that said Letters Patent is hereby corrected as shown below:

Column 10, Line 55, delete duplicate word "wherein"

Signed and Sealed this

Thirty-first Day of August, 2010

David J. Kappos
*Director of the United States Patent and Trademark Office*